US010048355B2

(12) United States Patent
Lim et al.

(10) Patent No.: US 10,048,355 B2
(45) Date of Patent: Aug. 14, 2018

(54) METHOD AND RADAR APPARATUS FOR DETECTING TARGET OBJECT

(71) Applicant: MANDO CORPORATION, Pyeongtaek-si, Gyeonggi-do (KR)

(72) Inventors: HaeSueng Lim, Yongin-si (KR); Seong Hee Jeong, Yongin-si (KR); JaeEun Lee, Seoul (KR); HyunChool Shin, Seoul (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 386 days.

(21) Appl. No.: 14/929,389

(22) Filed: Nov. 1, 2015

(65) Prior Publication Data

US 2016/0124084 A1 May 5, 2016

(30) Foreign Application Priority Data

Oct. 31, 2014 (KR) .................. 10-2014-0150721

(51) Int. Cl.
*G01S 13/93* (2006.01)
*G01S 7/35* (2006.01)
(Continued)

(52) U.S. Cl.
CPC .............. *G01S 7/354* (2013.01); *G01S 7/412* (2013.01); *G01S 13/34* (2013.01); *G01S 13/931* (2013.01);
(Continued)

(58) Field of Classification Search
CPC ....................................................... G01S 7/354
(Continued)

(56) References Cited

U.S. PATENT DOCUMENTS 3,750,169 A * 7/1973 Strenglein ............... B60R 19/40
342/21
6,011,507 A * 1/2000 Curran .................... G01S 7/354
342/70
(Continued)

FOREIGN PATENT DOCUMENTS

CN 103364778 A 10/2013
JP 09506425 A 6/1997
(Continued)

OTHER PUBLICATIONS

C. Feng, L. Xiao and Z. Wei, "Compressive sensing ISAR imaging with stepped frequency continuous wave via Gini sparsity," 2013 IEEE International Geoscience and Remote Sensing Symposium—IGARSS, Melbourne, VIC, 2013, pp. 2063-2066. (Year: 2013).*
(Continued)

*Primary Examiner* — Marcus E Windrich
(74) *Attorney, Agent, or Firm* — Hauptman Ham, LLP

(57) ABSTRACT

A radar apparatus comprises a signal transmission unit, a signal reception unit, a determination unit, and a target detection unit. The signal transmission unit transmits a transmission signal for detecting a target object. The signal reception unit receives a reception signal generated when the transmission signal is reflected. The determination unit determines a presence of a clutter structure using frequency response information of the reception signal. The target detection unit detects a target object by correcting a detection threshold value for detecting a target object according to the determination result on the presence of the clutter structure and detects a target object.

12 Claims, 14 Drawing Sheets

(51) Int. Cl.
  *G01S 7/41* (2006.01)
  *G01S 13/34* (2006.01)
(52) U.S. Cl.
  CPC ......... *G01S 7/414* (2013.01); *G01S 2007/356* (2013.01); *G01S 2013/9375* (2013.01)
(58) Field of Classification Search
  USPC .................................................. 342/70–72
  See application file for complete search history.

(56) References Cited

U.S. PATENT DOCUMENTS

| | | | | |
|---|---|---|---|---|
| 7,489,266 B2* | 2/2009 | Ohtake | ................. | G01S 13/345 |
| | | | | 342/107 |
| 7,504,986 B2* | 3/2009 | Brandt | ................. | G01S 13/931 |
| | | | | 340/435 |
| 7,570,198 B2* | 8/2009 | Tokoro | ................. | G01S 7/4004 |
| | | | | 342/70 |
| 8,558,733 B2* | 10/2013 | Kamo | ................. | G01S 7/295 |
| | | | | 342/27 |
| 9,689,987 B1* | 6/2017 | Jannson | ................. | G01S 17/66 |
| 2002/0171584 A1* | 11/2002 | Walker | ............... | H01Q 21/0025 |
| | | | | 342/368 |
| 2010/0265119 A1* | 10/2010 | Dove | ................. | G01S 5/0252 |
| | | | | 342/27 |
| 2016/0245911 A1* | 8/2016 | Wang | ................. | G01S 13/72 |

FOREIGN PATENT DOCUMENTS

| | | |
|---|---|---|
| JP | 2001324566 A | 11/2001 |
| KR | 101317887 B1 | 10/2013 |
| KR | 1020140010825 A | 1/2014 |

OTHER PUBLICATIONS

Chinese Office Action dated Aug. 17, 2017 from SIPO in connection with the counterpart Chinese Patent Application No. 201510737454.1.

Korean Office Action dated Feb. 11, 2016 in connection with the counterpart Korean Patent Application No. 10-2014-0150721.

* cited by examiner

METHOD AND RADAR APPARATUS FOR DETECTING TARGET OBJECT

CROSS-REFERENCE TO RELATED APPLICATION

This application claims priority from and the benefit under 35 U.S.C. § 119(a) of Korean Patent Application No. 10-2014-0150721, filed on Oct. 31, 2014, which is hereby incorporated by reference for all purposes as if fully set forth herein.

BACKGROUND OF THE INVENTION

1. Field of the Invention

The present invention relates to a method for detecting a target object by a radar apparatus for a vehicle and an apparatus therefor, and more particularly, to an apparatus and a method for preventing deterioration of performance through a signal processing technology by recognizing a situation in which the detection performance of a radar is deteriorated, for example, in a steel tunnel.

2. Description of the Prior Art

Vehicular radar refers to various forms of radar apparatuses that may be mounted on vehicles, and also refer to apparatuses used to prevent a possibility of an accident due to a bad weather condition or the carelessness of the driver and to detect an object around a vehicle.

In recent years, as safety and convenience of the users has been highly focused upon, various vehicle safety and convenience technologies using vehicular radar apparatuses have been developed. For example, various technologies such as a smart cruise technology of detecting a front vehicle and automatically following the detected front vehicle, an automated driving technology, and an autonomous emergency braking technology have been developed.

The vehicular radar that may be widely used in the technologies may detect surrounding obstacles using a reflection signal that is reflected after transmitting a radar signal.

However, in a section in which a steel tunnel or an noise barrier is installed and a section in which a structure that significantly reflects electromagnetic waves is installed, the vehicular radars often generate noise signals that are higher than target signals. As a result of this phenomenon, the vehicles may miss the front target vehicles, and may not detect the front targets in advance, causing an operation such as abrupt deceleration.

In this way, in spite of the big problem, a method and an apparatus capable of detecting a target signal in an environment in which disturbing signals are severely generated against a radar signal, for example, in a steel tunnel or an noise barrier have not been developed.

SUMMARY OF THE INVENTION

In this background, the present invention provides a method and an apparatus for recognizing a presence of a structure in which a clutter signal is severely generated, for example, in a steel tunnel, by analyzing a signal acquired from a radar apparatus.

The present invention also provides a method and an apparatus capable of recognizing a structure that severely generates a clutter signal and improving target detection performance to improve safety in a section in which the corresponding structure is installed.

In accordance with an aspect of the present invention, there is provided a radar apparatus including: a signal transmission unit that transmits a transmission signal for detecting a target object; a signal reception unit that receives a reception signal generated when the transmission signal is reflected; a determination unit that determines a presence of a clutter structure using frequency response information of the reception signal; and a target detection unit that detects a target object by correcting a detection threshold value for detecting a target object according to the determination result on the presence of the clutter structure and detects a target object.

In accordance with another aspect of the present invention, there is provided a method for detecting a target object using a radar, the method including: transmitting a transmission signal for detecting a target object; receiving a reception signal generated when the transmission signal is reflected; determining a presence of a clutter structure using frequency response information of the reception signal; and correcting a detection threshold value for detecting a target object according to the determination result on the presence of the clutter structure, and detecting a target object.

As described above, the present invention can provide a method and an apparatus for recognizing a presence of a structure in which a clutter signal is severely generated, for example, in a steel tunnel by analyzing a signal acquired from a radar apparatus.

Furthermore, the present invention can provide a method and an apparatus capable of recognizing a structure that severely generates a clutter signal and improving target detection performance to improve safety in a section in which the corresponding structure is installed.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Figure 1:
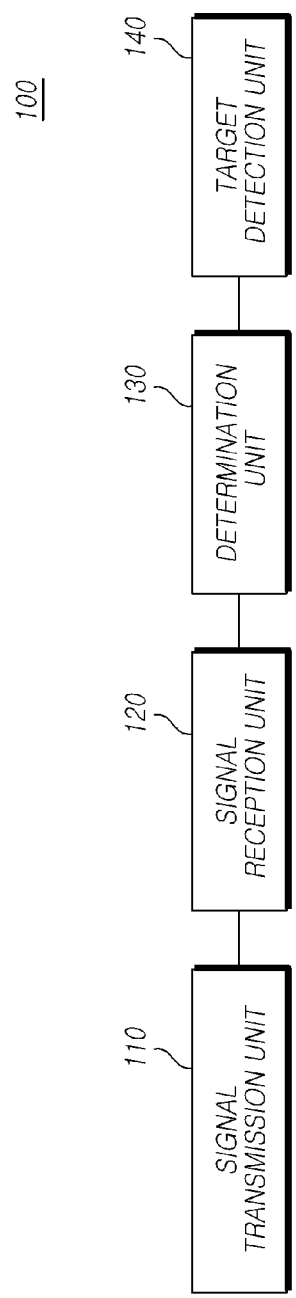
FIG. 1 is a block diagram illustrating a configuration of a radar apparatus according to an embodiment of the present invention.

Hereinafter, exemplary embodiments of the present invention will be described in detail with reference to the accompanying drawings. In the description of the elements of the present invention, terms "first", "second", "A", "B", "(a)", "(b)" and the like may be used. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

The present invention discloses a radar apparatus and a method for detecting a target object by the radar apparatus.

In a situation where vehicular radar is gradually becoming more common, various driver convenience functions are being developed. As an example of the convenience functions, an adaptive cruise control (ACC) function is a function of automatically controlling the speed of a vehicle or the like while automatically maintaining a safety distance from a front target vehicle.

However, in order to provide conveniences for the driver by normally operating the function, it is important for a radar apparatus for continuously detecting and tracking the front vehicle to have high reliability. The reliability of the radar apparatus is higher than that of another sensor such as a camera in a stormy or foggy situation where a sufficient field of view cannot be secured, but when structures, such as various steel structures which severely reflect electromagnetic waves, are present on the roads, a signal of a clutter structure is higher than a signal reflected from a target, causing deterioration of the detection performance of the radar.

In order to solve the above-mentioned problems, the present invention discloses a radar apparatus that can promptly and precisely detect a target object using signal processing even in an environment in which a plurality of clutter structures are present and a method of detecting a target object.

A clutter refers to a reflection obstacle, such as an echo, which may be caused by an unnecessary reflective wave generated due to the ground surface, the oceanic surface, rain drops, and the like. In the specification, a clutter structure refers to an object that causes a clutter, and a clutter signal refers to a signal that is received by a radar due to an unnecessary reflective wave. The clutter signal is distinguished from a noise signal, and may be received while having a stronger intensity than that of a target signal by a target object and thus may cause a problem in detecting a target object.

In the following description, a clutter structure may refer to a structure around or on a road, which generates a clutter signal when a radar signal is received.

FIG. 1 is a block diagram illustrating a configuration of a radar apparatus according to an embodiment of the present invention.

The radar apparatus 100 according to an embodiment of the present invention may include a signal transmission unit 110 that transmits a transmission signal for detecting a target object, a signal reception unit 120 that receives a reception signal generated when the transmission signal is reflected, a determination unit 130 that determines a presence of a clutter structure using frequency response information of the reception signal, and a target detection unit 140 that detects a target object by correcting a detection threshold value for detecting a target object according to the determination result on the presence of the clutter structure and detects a target object.

Referring to FIG. 1, the radar apparatus 100 of the present invention includes a signal transmission unit 110 that transmits a transmission signal for detecting a target object. The transmission signal may refer to an RF signal having a frequency band for a radar signal. The radar apparatus may transmit a transmission signal at a predetermined cycle or continuously to a front side or to a periphery of the vehicle and detect a target object.

Also, the radar apparatus 100 of the present invention may include a signal reception unit 120 that receives a reception signal generated when a transmission signal is reflected. The reception signal refers to a signal that is reflected by a target or various surrounding objects that generate reflective waves and is received by a reception antenna. Accordingly, the radar apparatus 100 may transmit a transmission signal at a predetermined cycle or continuously and detect a target object using a reception signal that is a reflection signal of the corresponding transmission signal.

In the present invention, the radar apparatus 100 may be one of various types of radar apparatuses, and is not limited by the type of a transmission signal or a reception signal and a signal transmission/reception scheme. Meanwhile, in the following description, a forward looking FMCW radar for a 77 GHz long-range is assumed for convenience of description.

The radar apparatus 100 of the present invention may include a determination unit 130 that determines a presence of a clutter structure using frequency response information of a reception signal. The determination unit 130 may calculate frequency response information of a reception signal and determine a presence of a clutter structure based on the frequency response information.

Here, a clutter structure may include one or more of a steel tunnel, a steel noise barrier, and a steel structure, which generate clutter signals. That is, the clutter structure may refer to a steel structure that may generate a plurality of reflective waves from a transmission signal, and may refer to a steel tunnel installed on a road or a steel noise barrier installed on one side or opposite sides of a road. The clutter structure may be a structure of different materials, and the structure refers to an object that generates a plurality of reflective waves and generates a clutter signal.

The determination unit 130 may generate frequency response information using a reception signal by using a generally used radar reception signal processing algorithm. The frequency response information generated through this may be variously expressed by frequency-magnitude response information, frequency spectrum information, and the like, and the present invention is not limited thereto.

As an example, a method of generating frequency response information using a reception signal by the determination unit 130 will be briefly described.

Signals for channels that are received after a signal transmitted from an FMCW radar is reflected by L targets may be defined as in Equation 1.

$$S_k(t) = \sum_{i=0}^{L-1} A_k(i)\cos(2\pi f(i)t + \phi_k(i)).\qquad\text{Equation 1}$$

Ak(i) is the amplitudes of signals that are reflected by targets. f(i) is the sum of fr(i) that is a difference value of frequencies due to the distance of a target and fd(i) that is generated by a relative speed, and may be obtained in Equations 2 and 3.

$$f_r(i) = \frac{2B}{cT}R(i)\qquad\text{Equation 2}$$

$$f_d(i) = \frac{2f_c}{c}V_r(i) = \frac{2}{\lambda}V_r(i)\qquad\text{Equation 3}$$

Here, B is a bandwidth, T is a duration of a chirp, c is the speed of light, $f_c$ is a center frequency, and R(i) and $V_r(i)$ are a distance and a relative speed, respectively. Further, $\phi_k(i)$ is phase components for channels of reception signals.

$S_k(n)$ is a discrete-time signal of $S_k(t)$, and may be represented as in Equation 4.

$$S_k(n) = \sum_{i=0}^{L-1} A_k(i)\cos(2\pi f(i)t + \phi_k(i))\qquad\text{Equation 4}$$

Here, n is a discrete-time index of a reception signal during a single scan and N is the total number of samples of reception signals during a single scan.

If the reception signal is processed through short-time Fourier transform (SIFT), it may be expressed as in Equation 5.

$$S_k(f, m) = \sum_{i=0}^{N-1} S_k(n + (m-1)\cdot N)e^{-j\frac{2\pi f}{N}n}\qquad\text{Equation 5}$$

Here, f is a frequency index and m is a scan index.

A magnitude response obtained by adding frequency domain signals for reception channels may be obtained as in Equation 6.

$$P(f, m) = \left|\sum_{k=0}^{K-1} S_k(f, m)\right|\qquad\text{Equation 6}$$

As described above, the determination unit may calculate frequency response information using a reception signal. Although an example of calculating frequency-magnitude response information has been described, various pieces of frequency related response information such as frequency spectrum information may be calculated in addition. The method of calculating frequency related response information is not limited.

A detailed method for determining a presence of a clutter structure using frequency response information of a reception signal by the determination unit 130 will be described below in more detail with reference to the accompanying drawings.

Meanwhile, the radar apparatus 100 of the present invention may include a target detection unit 140 that detects a target object by correcting a detection threshold value for detecting a target object according to the determination result on a presence of a clutter structure. The target detection unit 140 may detect a target object by detecting a target signal reflected from a target object using a received reception signal. In this case, detection threshold value information may be used to detect a target signal by distinguishing the target signal from a noise signal and the like. That is, a target signal excluding noise may be detected only when a detection threshold value is set and signal intensities for frequencies exceed the detection threshold value.

Meanwhile, because a case in which a target signal is weaker than a clutter signal may occur if a plurality of clutter signals are present as in the present invention, there may be a problem in detecting the corresponding target object. Accordingly, if it is determined that a clutter structure is present, the target detection unit 140 needs to detect a target object by adjusting a detection threshold value such that a target signal may be detected.

The detection threshold value of the present invention may be a value fixed or changed through settings, or may be a value dynamically calculated in consideration of the intensities of peripheral frequencies.

The target detection unit 140 may correct a detection threshold value and detect a final target object using an adaptive algorithm for detecting a target. As an example, an adaptive algorithm for detecting a target may include Constant False Alarm Rate (CFAR) and the like, and in addition, various algorithms for detecting a target object from a reception signal in response to background noise such as noise, a clutter signal, or an interference may be used.

Figure 2:
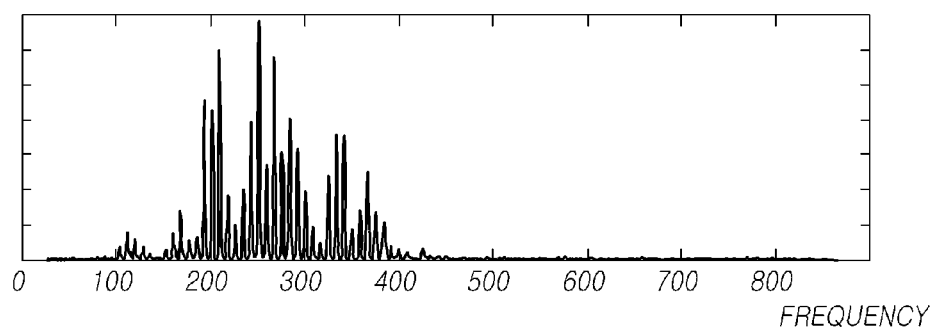
FIG. 2 is a diagram illustrating an example of frequency response information of a reception signal that is received by a reception unit of the present invention.

FIG. 2 is a diagram illustrating an example of frequency response information of a reception signal that is received by a reception unit of the present invention.

The reception signal of the present invention may include a target signal reflected by a target object and a clutter signal generated by a clutter structure.

Referring to FIG. 2, the signal reception unit receives a reception signal. The reception signal may include a signal obtained by reflecting a transmission signal on an object. In other words, the reception signal may include a target signal received after a signal is reflected by a target object, a clutter signal generated by a surrounding clutter structure, and a noise signal.

That is, if frequency response information of the reception signal is calculated, a plurality of clutter signals as well as a target signal may be received while the intensities of the clutter signal are stronger than the intensity of the target signal when the number of the clutter signals is plural as illustrated in FIG. 2. Accordingly, because a plurality of clutter signals appear stronger than the intensity of the target signal, the radar apparatus has a problem in detecting a target object.

In this way, in a situation where a plurality of clutter signals are generated, a distance required to detect a target object by the radar apparatus becomes shorter, a time period for detecting the target object becomes longer, and the radar apparatus may miss the target object according to situations.

Figure 3A:
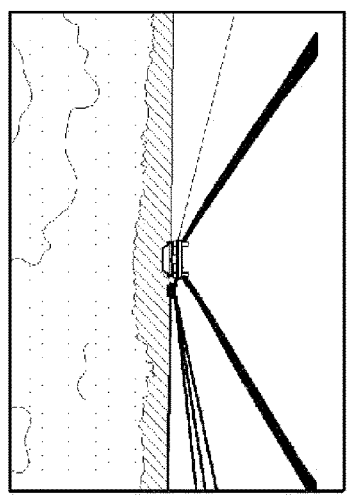
FIGS. 3A and 3B are views exemplarily illustrating a reception signal in a general road situation and a reception signal by a clutter according to the present invention.
Figure 3A:
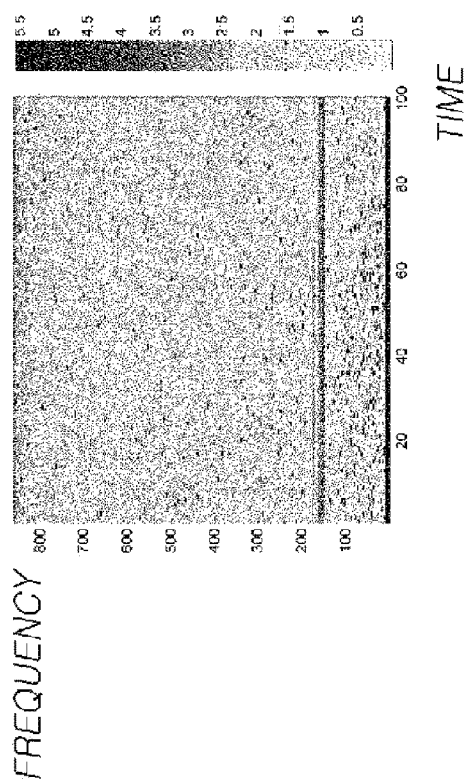
Figure 3B:
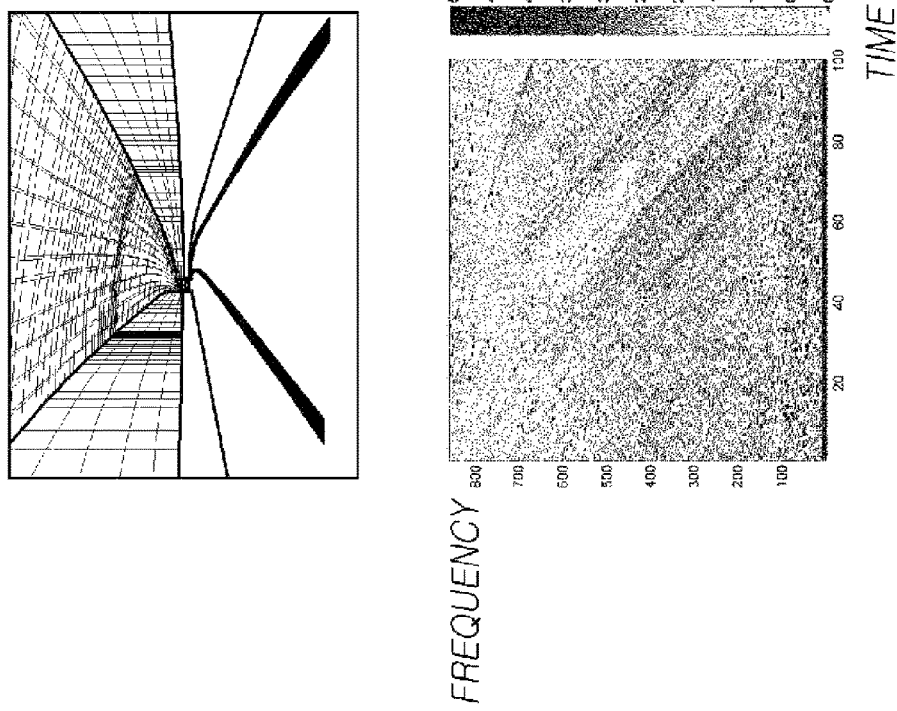

FIGS. 3A and 3B are views exemplarily illustrating a reception signal in a general road situation and a reception signal by a clutter structure of a radar apparatus according to the present invention;

As illustrated in FIG. 3A, if a spectrum is analyzed using frequency response information in a general road situation, a signal appears strong in a specific frequency band. Because strong signals at around 150 KHz are consistently received irrespective of time in FIG. 3A, it can be seen that the corresponding signals are target signals reflected on a front vehicle. Because a clutter signal due to a surrounding structure is clearly distinguished from a target signal in a general road situation, there occurs no problem in detecting a target object.

However, when a steel structure such as a steel tunnel is present on a road as illustrated in FIG. 3B, clutter signals increase due to reflective waves by the steel structure. Accordingly, because clutter signals of high intensity at various frequency bands are received, it is difficult to detect a target signal for detecting a front target object.

In this way, when a structure that generates a plurality of clutter signals around or on a road is present, a detection performance for a target object seriously deteriorates due to the clutter signals.

In order to solve the problem, the radar apparatus of the present invention needs to determine in advance whether a clutter structure is present by using frequency response information of a reception signal. If it is determined in advance that a clutter structure is present, a target signal may be detected in response to a clutter signal by adjusting a parameter for detecting a target signal.

Hereinafter, various embodiments of determining whether a clutter structure is present using a reception signal by a determination unit will be described with reference to the drawings.

Figure 4:
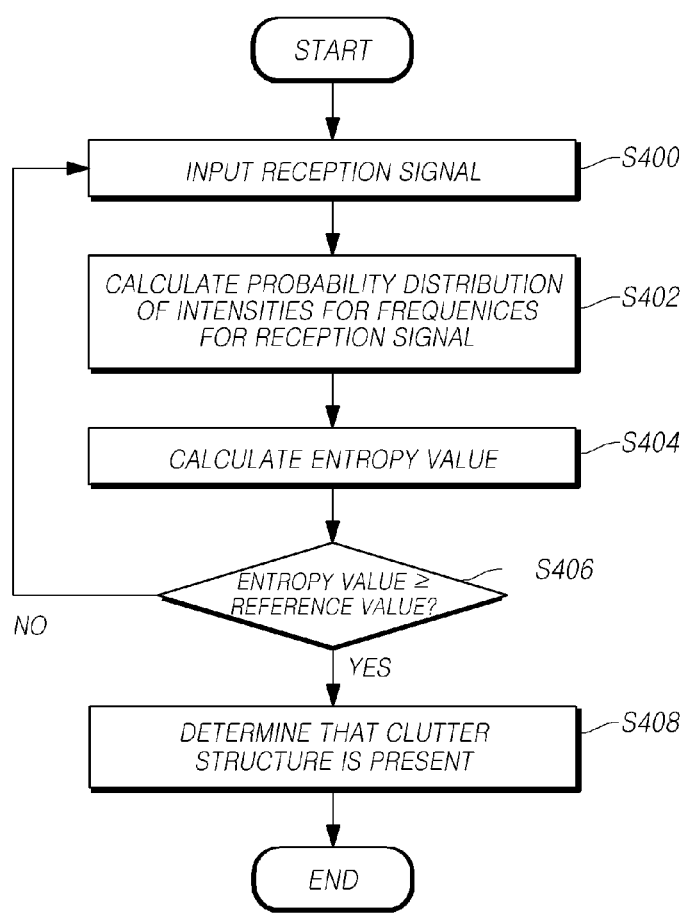
FIG. 4 is a flowchart illustrating an operation of a determination unit according to an embodiment of the present invention.

FIG. 4 is a flowchart illustrating an operation of a determination unit according to an embodiment of the present invention.

The determination unit according to an embodiment of the present invention may further include an entropy detection unit that calculates an entropy value of a reception signal using frequency response information. The entropy detection unit may calculate a probability distribution of signal intensities for frequencies using frequency response information of a reception signal and calculate an entropy value according to the calculated probability distribution.

In this case, the determination unit may determine that a clutter structure is present if the calculated entropy value is a predetermined reference value or more. The entropy detection unit may use a histogram to calculate a probability distribution of signal intensities for frequencies using the frequency response information of the reception signal.

Also, the determination unit may measure a frequency spectrum spreading degree based on the frequency response information and determine a presence of a clutter structure according to the corresponding spectrum spreading degree.

Referring to FIG. 4, the determination unit receives a reception signal (S400). The reception signal may contain a small amount of clutter signals in a general road situation, and may contain a large amount of clutter signals when a clutter structure is present.

The determination unit may calculate probability distribution information of intensities for frequencies using the received reception signal (S402). As described above, when a clutter structure is present, signals of high intensities are received at a plurality of frequencies. Accordingly, the determination unit may determine a presence of a clutter structure by determining whether signals of high intensities are received at a plurality of frequency bands.

To achieve this, the determination unit calculates probability distribution information of signal intensities for frequencies. By calculating the probability distribution information, the scattering degree of frequency components of the signals contained in the reception signal can be quantitatively identified. The reason why the quantitative identification is required is that a more precise determination can be made when an objective index for comparison with a reference value is present.

Meanwhile, the determination unit may calculate an entropy value using the calculated probability distribution information (S404). The entropy value expresses a disorder degree with an quantitative value and the probability distribution is uniform when the frequency magnitude response information is spread out over a wide band, and in this case, because the values are not concentrated in a specific band but appear disorderly, the entropy value increases.

An exemplary method for calculating an entropy value will be described again as follows.

The determination unit may compare the calculated entropy value with a predefined reference value (S406). The predefined reference value is a reference value for determining a presence of a clutter structure through experiments and may be set in advance and stored in the vehicle.

The determination unit may determine that a clutter structure is present in a radar detection distance of the vehicle if the entropy value is determined to be a reference value or more (S408).

If the entropy value is determined to be less than a reference value, it is determined that there is no clutter structure in the radar detection distance of the vehicle and the next reception signal may be received to repeat the clutter structure determining operation.

In this way, the determination unit may calculate a probability distribution of signal intensities for frequencies using the frequency response information of the reception signal, and determine a presence of a clutter structure by calculating an entropy value based on the calculated probability distribution. Because the calculated entropy value quantitatively represents information on a frequency spectrum spreading degree, a presence of a clutter structure may be determined using the calculated entropy value.

In the following, a method of calculating an entropy value for quantitatively measuring a frequency spectrum spreading degree by the determination unit will be exemplified.

The determination unit may quantitatively calculate a spectrum spreading degree using Shannon Entropy (SE). The Shannon entropy is generally used to measure the uncertainty of information, and may be expressed in Equation 7 as follows.

$$SE = -\sum_{i=0}^{N} p(i)\log_2 p(i) \quad \text{Equation 7}$$

Here, p(i) is a probability density function (pdf) of a system. The value of SE is large when p(i) is uniformly distributed, and is small when p(i) is distributed narrowly.

When the frequency magnitude responses are spread out over a wide band, the probability distribution of magnitudes is uniform, and in this case, the spectrum spreading degree has a large value. In contrast, when the frequencies are concentrated in a narrow band, the probabilities of magnitudes are distributed narrowly and the corresponding S(m) has a low value.

In this way, the determination unit calculates a probability distribution degree of frequency magnitudes, and the spreading degree of the spectrum may be measured by obtaining an SE through this calculation.

In order to obtain a probability distribution of frequency magnitude responses, a histogram according to intensities may be calculated as in Equation 8.

$$p_m(i) = \frac{(\text{number of samples} \in B_i)}{N},$$
$$(0 \le i \le I)$$

Equation 8

Here, pm(i) denotes a probability distribution of frequency magnitude responses, and N denotes the total number of samples in the m-th scan. Bi may be defined by Equation 9.

$$B_i = \left(P(f, m) \middle| P_{max} \cdot \frac{i}{I} \le \left(P(f, m) \le P_{max} \cdot \frac{i+1}{I}\right)\right)$$

Equation 9

Here, $P_{max}$ denotes a maximum value of P(f,m). Accordingly, the above-mentioned spectrum spreading degree may be expressed as in Equation 10.

$$S(m) = -\sum_{i=0}^{I-1} p_m(i) \log p_m(i).$$

Equation 10

In summary, a plurality of frequency peaks exist due to signals that are reflected by a target in a situation where signal components of a specific noise level are present in a frequency spectrum in a general road situation, and because the targets are present on the same azimuth plane in the field of view of the radar even when many vehicle are present on a road, the number of frequency peaks due to the targets is limited. Accordingly, when histograms of the frequency spectrum are obtained, their distribution is not uniform and is concentrated in a specific frequency band so that the spectrum spreading degree is small.

Meanwhile, because clutter structures are densely distributed and the intensities of the reflection signals decrease according to distance by damping of the reflection signals, the intensities of the reflection signals vary according to distance even though the clutter structures are formed of the same material. Furthermore, because the clutter structures are not present on the same azimuth plane as that of the vehicle but are distributed at different angles in an elevation direction, the intensities of the reflection signals are different due to the difference of antenna gains according to the elevation beam width of the antenna. Due to the factor, the distribution of the intensities of the frequency magnitude responses of the reflection signals becomes more uniform, and accordingly, the spectrum spreading degree becomes larger.

For example, as described above, the determination unit may determine a presence of a clutter structure based on a frequency spectrum spreading degree using frequency response information of a reception signal. As an example, the determination unit may calculate an entropy value and determine a presence of a clutter structure through comparison with a predefined reference value.

An example of determining a presence of a clutter structure by recognizing an entropy value or a spectrum spreading degree by the determination unit will be described with reference to FIGS. 5 and 6.

Figure 5:
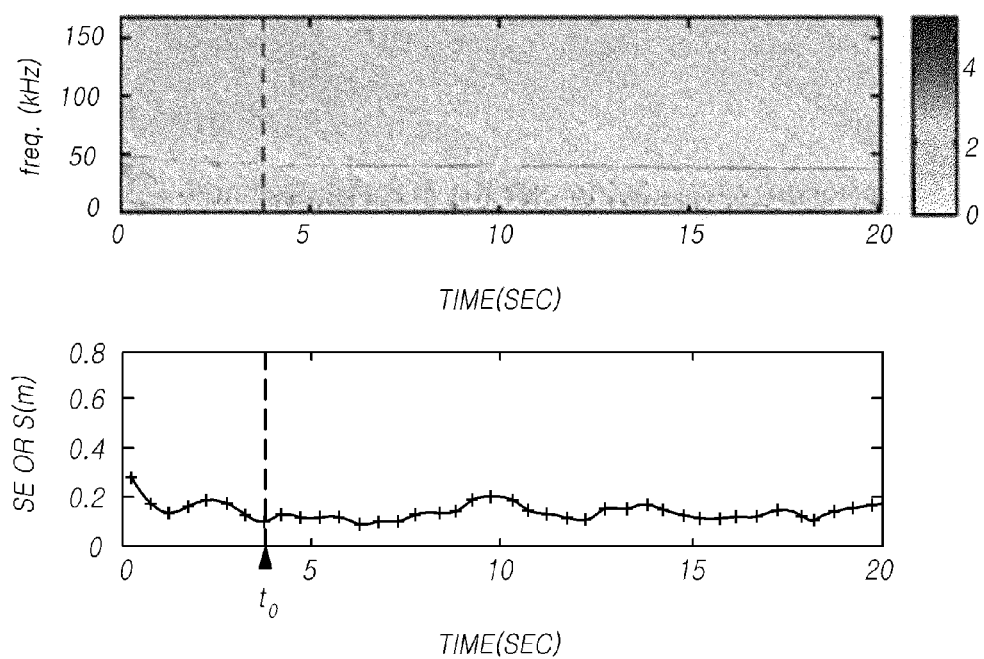
FIG. 5 is a view illustrating an example of detecting an entropy value using frequency response information of a reception signal by a determination unit according to an embodiment of the present invention.

FIG. 5 is a view illustrating an example of detecting an entropy value using frequency response information of a reception signal by a determination unit according to an embodiment of the present invention. FIG. 6 is a view illustrating an example of detecting an entropy value for a reception signal when a clutter structure is present by a determination unit according to an embodiment of the present invention.

Figure 6:
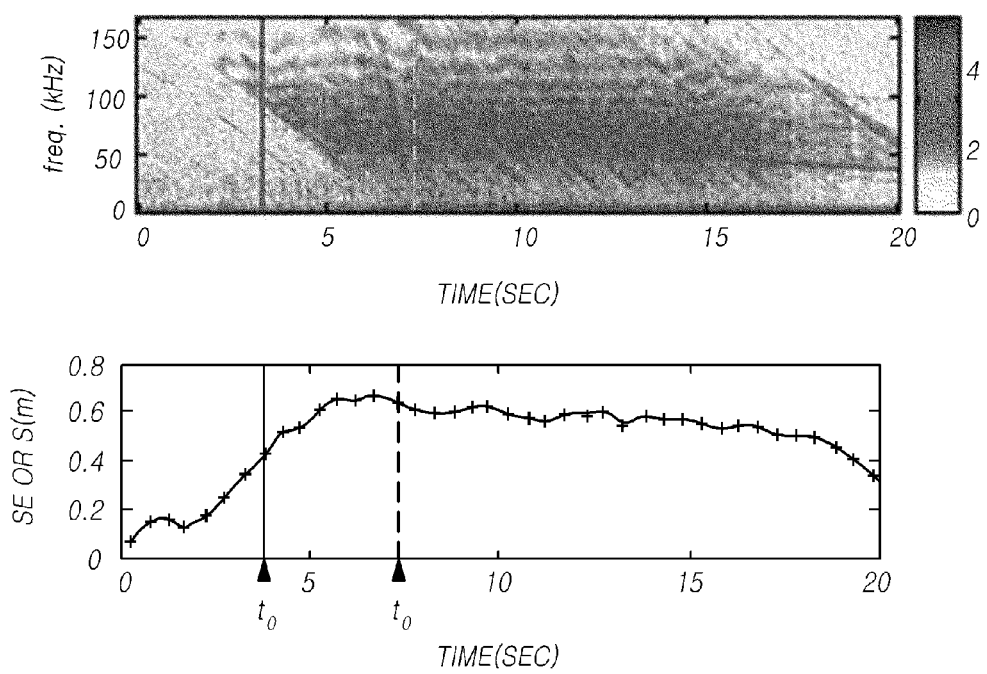
FIG. 6 is a view illustrating an example of detecting an entropy value for a reception signal when a clutter structure is present by a determination unit according to an embodiment of the present invention.

FIGS. 5 and 6 illustrate a graph depicting time-frequency response information displayed based on a reception signal and an entropy value (SE) or a spectrum spreading degree (S(m)) and a time graph. FIG. 5 illustrates a determination result of the determination unit in a general road situation, and FIG. 6 illustrates a determination result of the determination unit when a clutter structure is present.

Referring to FIG. 5, it can be seen that target signals around 50 KHz are intensively received on a general road. In this case, the determination unit may calculate an entropy value or a spectrum spreading degree based on frequency response information of a reception signal. FIG. 5 exemplifies an SE or S(m) value according to time. That is, because a signal intensity of a specific frequency band is strongly detected in a general road situation and signals are concentrated in the corresponding frequency band, the calculated SE or S(m) value is low. That is, at time point $t_0$, the SE or S(m) value is not significantly changed but is maintained at a 0.2 or less.

Accordingly, in the situation of FIG. 5, the determination unit may determine that there is no clutter structure present by calculating and monitoring the SE or S(m) value.

In contrast, referring to FIG. 6, it can be seen that reception signals are uniformly received in all the frequency bands by the clutter structures.

In this case, the determination unit may detect a presence of a clutter structure by calculating the SE or S(m) through the above-mentioned method. As an example, when a clutter structure such as a steel tunnel is present at time point $t_0$, the radar apparatus of the vehicle receives reception signals in which clutter signals gradually increase as the vehicle approaches the clutter structure from the outside of a radar detection range. Accordingly, the SE or S(m) calculated by the determination unit gradually increases. That is, at time point $t_r$, when a predefined reference value is exceeded first, the determination unit may determine that a clutter structure is present in front of the vehicle. In this case, the predefined reference value may be predefined through settings.

Accordingly, by recognizing a presence of the clutter structure at time point $t_r$ before the vehicle enters the clutter structure, there is a sufficient time period in which a parameter for processing a radar signal can be secured before time point $t_0$ when the vehicle actually enters the clutter structure. Through this process, the above-mentioned problem due to the clutter signal can be prevented and the reliability of the radar apparatus can be enhanced.

Figure 7:
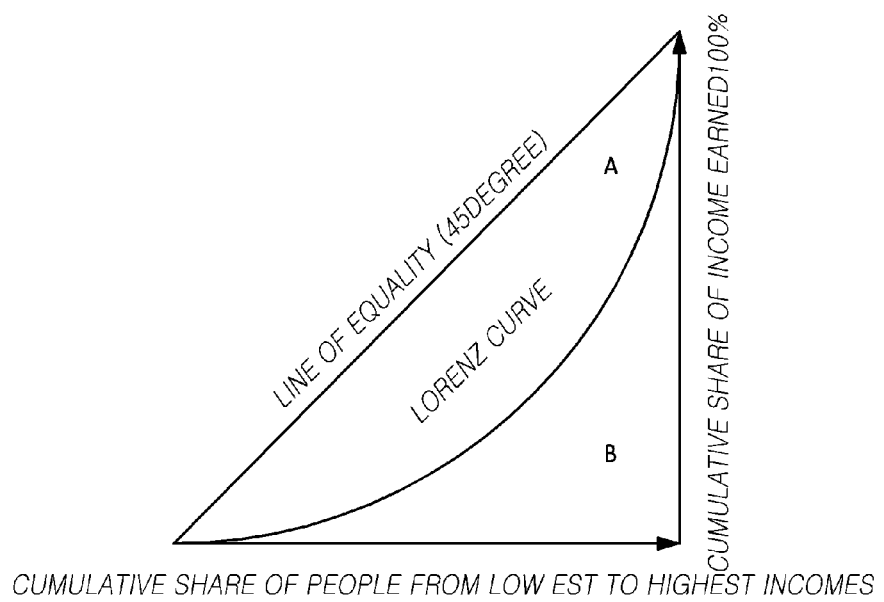
FIG. 7 is a view for explaining a Gini's coefficient of the present invention.

FIG. 7 is a view for explaining a Gini's coefficient of the present invention.

The determination unit according to an embodiment of the present invention may determine a presence of a clutter structure by comparing Gini's coefficient information calculated based on frequency response information with a preset reference value.

Referring to FIG. 7, the Gini's coefficient represents an inequality degree of distributions of objects. That is, when the distributions of objects are perfectly equal, the Lorentz curve coincides with a line of equality of a diagonal line, and when the distributions of objects are perfectly unequal, the Lorentz curve is moved to the right lower side.

An equation for calculating the Gini's coefficient may be expressed by Equation 11.

$$Gini's\ coefficient = \frac{area(A)}{area(A) + area(B)} \quad \text{Equation 11}$$

Referring to Equation 11, the Gini's coefficient is a value between 0 and 1, and means that an inequality degree is low when the value is close to 0 and means that an inequality degree is high when the value is close to 1.

The determination unit of the present invention may determine a presence of a clutter structure using the Gini's coefficient. That is, because inequality degrees for frequencies are low when signal intensities having similar frequencies are received over a wide band based on frequency response information, the Gini's coefficient may be close to 0. Meanwhile, if the detected target signals are concentrated only in a specific frequency band and a clutter signal is not detected, the inequality degrees for frequencies increase and the Gini's coefficient is close to 1.

Accordingly, the determination unit may calculate a Gini's coefficient based on frequency response information, and may determine a presence of a clutter by comparing a preset reference value with the Gini's coefficient. For example, the determination unit may determine that a clutter structure is present when the calculated Gini's coefficient is a preset reference value or less.

Figure 8A:
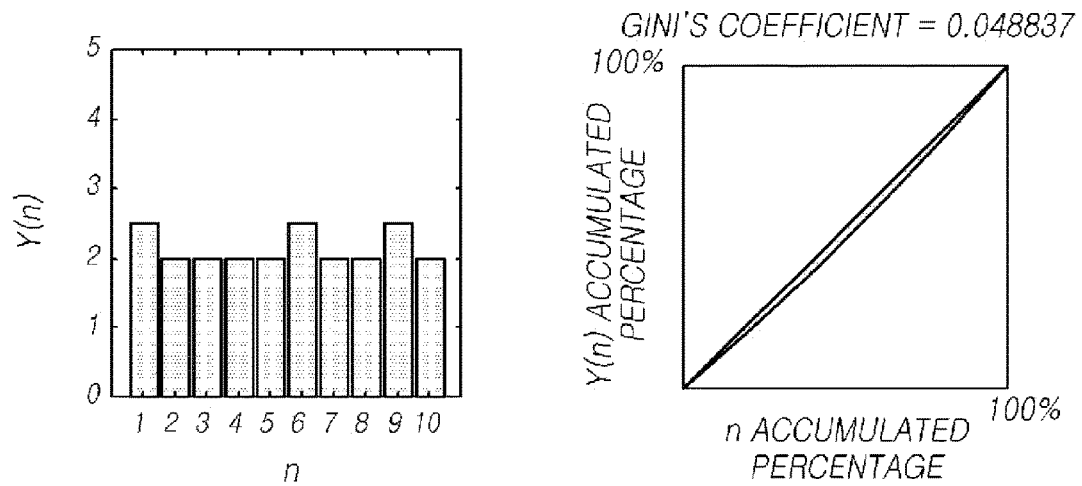
FIGS. 8A and 8B are views for explaining an operation of detecting a clutter structure using a Gini's coefficient according to an embodiment of the present invention.
Figure 8B:
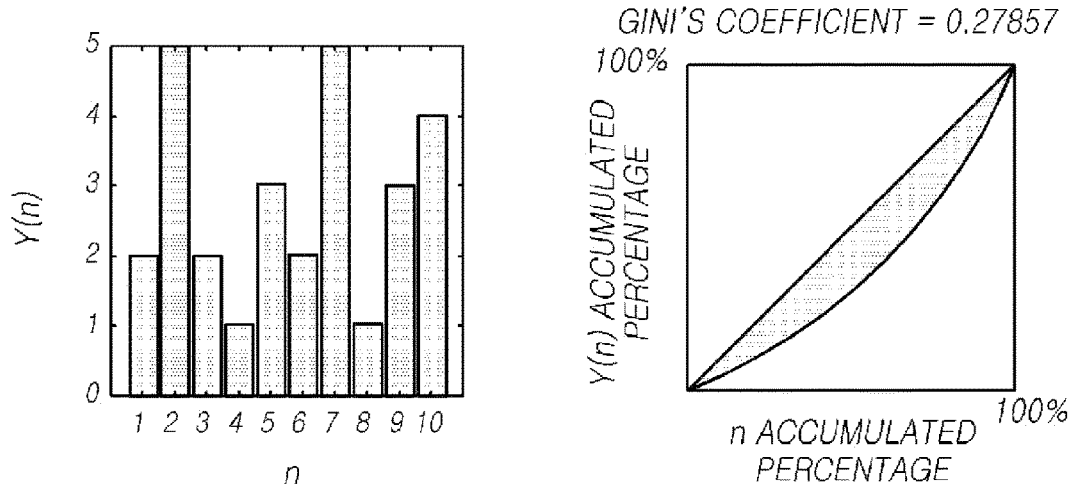

FIGS. 8A and 8B are views for explaining an operation of detecting a clutter structure using a Gini's coefficient according to an embodiment of the present invention.

An example of determining a presence of a clutter structure using a Gini's coefficient by the determination unit will be described with reference to FIGS. 8A and 8B. As an example, n denotes a frequency index number, and Y(n) denotes the intensity of a reception signal.

Accordingly, in FIG. 8A, similar values are detected in the entire index, which means that a degree of inequality is low. Accordingly, the Gini's coefficient is close to 0. Through this process, the determination unit may determine that a clutter structure is present in a radar detection range.

In contrast, in FIG. 8B, deviations of values slightly occur. For example, a high value is detected in a specific index. In this case, as the inequality degree slightly increases, the Gini's coefficient of FIG. 8A may be higher than that of FIG. 8B. If the reference value is set to be 0.2 in FIG. 8B, it may be determined that a clutter structure is not present as the Gini's coefficient exceeds 0.2.

In this way, the determination unit may detect a presence of a clutter structure in advance using the Gini's coefficient.

Meanwhile, the determination unit of the present invention may use a binary spectrum to determine a presence of a clutter structure more precisely. For example, the determination unit may change the above-mentioned frequency response information to a binary spectrum using a preset binary reference value. For example, the determination unit may change the frequency response information to a binary spectrum by changing values for the intensities of signals for frequencies of the frequency response information to a value of K when they are a binary reference value or more, and changing values for the intensity of signals for frequencies of the frequency response information to a value of 0 when they are less than the reference value. K is determined by any one value of 2a, and a is a natural number that is 0 or more. That is, K may be determined to be 1, 2, or 4. In the same way, K may be any one value of 2 to the powers of natural numbers. In addition, the K value used when the determination unit of the present invention converts frequency response information to a binary spectrum is not limited. That is, K may be determined to be a predetermined value through experiments. Meanwhile, the binary reference value may be a preset value to remove noise signals. An equation for changing frequency response information to a binary spectrum may be exemplified by Equation 12.

$$P_{BS}(f, m) = \begin{cases} 1, & \text{where } P(f, m) \geq \alpha \\ 0, & \text{where } P(f, m) < \alpha \end{cases} \quad \text{Equation 12}$$

Here, $P_{BS}(f,m)$ denotes a binary spectrum, and $P(f,m)$ denotes frequency response information. $\alpha$ is a preset value and denotes a binary reference value. $\alpha$ may be determined with reference to a noise floor. For example, $\alpha$ is determined by a multiple of a noise floor.

Thereafter, the determination unit may determine a presence of a clutter structure with the binary spectrum changed to a binary value using the above-mentioned spectrum spreading information, entropy value, or Gini's coefficient. A more robust result may be obtained by using a binary spectrum instead of frequency response information.

As an example, a method of using a Gini's coefficient with a binary spectrum may be expressed as in Equation 13.

$$BSI(m) = \frac{\sum_{f=0}^{N-1} P_{BS}(f, m)}{N} \quad \text{Equation 13}$$

In Equation 13, $BS_I$ denotes a Gini's coefficient calculated using a binary spectrum, and $P_{BS}(f,m)$ denotes a binary spectrum. Accordingly, the determination unit may calculate a Gini's coefficient for a binary spectrum using Equation 13, and may determine a presence of a clutter structure using the calculated Gini's coefficient.

As described above, the radar apparatus of the present invention may detect a presence of a clutter structure through the above-mentioned operation. Thereafter, the radar apparatus may correct a detection threshold value to detect a target signal in a situation where clutter signals are severe. Hereinafter, an operation of the target detection unit will be described.

Figure 9:
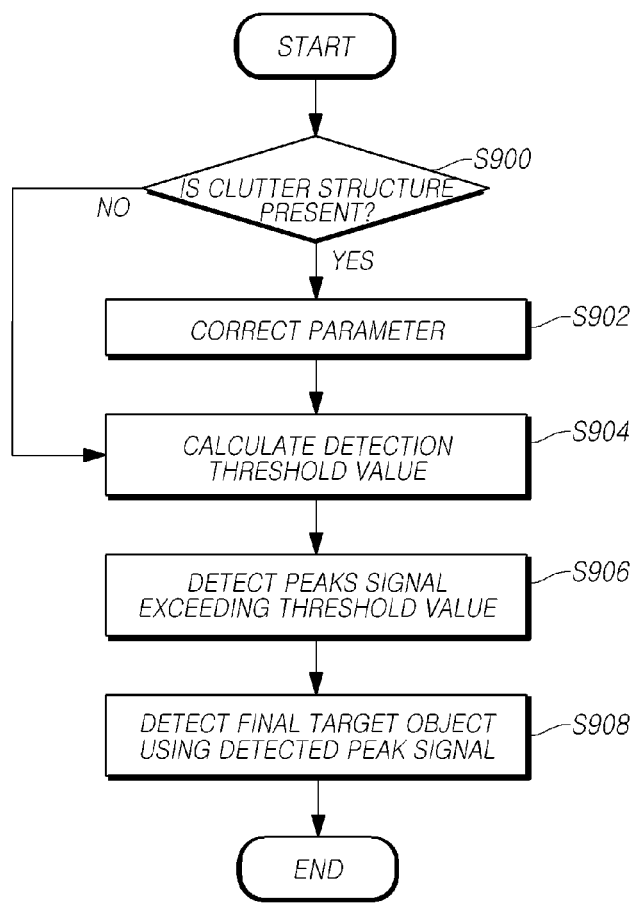
FIG. 9 is a flowchart illustrating an operation of a target detection unit according to an embodiment of the present invention.

FIG. 9 is a flowchart illustrating an operation of a target detection unit according to an embodiment of the present invention.

The target detection unit of the present invention calculates detection threshold values for detecting a target object separately according to a presence of a clutter structure, and may calculate a detection threshold value using a corrected detection threshold value calculation parameter such that a detection threshold value for detecting a target object when a clutter structure is present is lower than a detection threshold value when a clutter structure is not present. That is, the target detection unit may calculate a detection threshold value using different detection threshold value calculation parameters according to a presence of a clutter structure. The detection threshold value may be calculated through a CFAR algorithm.

Referring to FIG. 9, the target detection unit identifies a presence of a clutter structure (S900). That is, the presence of a clutter structure is identified according to the above-mentioned determination result of the determination unit, and if it is identified that a clutter structure is not present, a target signal is detected by using an existing detection threshold value. If it is identified that a clutter structure is present, a parameter for adjusting a detection threshold value may be corrected (S902).

Thereafter, the target detection unit may calculate a detection threshold value using the corrected parameter (S904). The detection threshold value is for, when a target signal is received at an intensity of a threshold value or more, detecting the corresponding target signal to remove noise, and may be calculated using various algorithms. As an example, a CFAR algorithm may be used to determine a detection threshold value using intensity information of surrounding frequencies, and the detection threshold value may be lowered by correcting a parameter for determining the detection threshold value to a preset value. Through the process, a target signal may be detected even if a strong clutter signal is received.

The target detection unit may detect a peak signal that exceeds a threshold value using the determined detection threshold value (S906). In this case, the detection threshold value may be lower than the target signal, and accordingly, a plurality of target signals and a plurality of clutter signals are detected.

The target detection unit may detect a final target object using at least one detected peak signal. As an example, the target object is an object that moves towards a front vehicle, and the clutter structure is a fixed object such as a steel tunnel. Accordingly, the target object that is a final moving object may be detected through an algorithm such as filtering of a detected peak signal.

Figure 10:
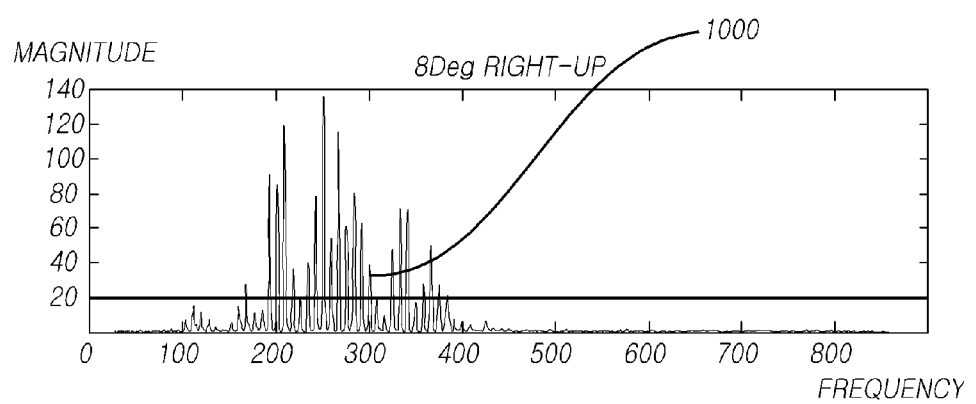
FIG. 10 is a view for explaining an operation of detecting a target object using a correction threshold value by a target detection unit according to an embodiment of the present invention.

FIG. 10 is a view for explaining an operation of detecting a target object using a correction threshold value by a target detection unit according to an embodiment of the present invention.

If it is determined that a clutter structure is present, the target detection unit according to the embodiment of the present invention may change a detection threshold value to a preset correction threshold value and detect a target signal generated by a target object.

Referring to FIG. 10, when a reception signal containing a clutter signal by a clutter structure and a target signal is received, the target detection unit may change a detection threshold value to a correction threshold value stored in advance if it is identified that a clutter structure is present.

As an example, the correction threshold value may be set to one value. FIG. 10 exemplifies that the correction threshold value is 20, and because the target signal 100 is detected to be the correction threshold value or more, a target signal may be detected.

As another example, the correction threshold value may be set to different values for frequencies. For example, the correction threshold value may be set to a value that gradually decreases if the frequency increases. That is, the correction threshold value may be set as a function that is dependent on frequencies. That is, the correction threshold value may be determined to be a value that is inversely proportional to $R^4$. Here, R denotes a distance from a target object, and may also denote frequency. As another example, the correction threshold value may be determined to be a value that is preset according to a road surface state, inclination information, or the like. As another example, the correction threshold value may be determined according to an equation in which a road state, inclination information, and the like are used as additional factors.

Through this process, the correction threshold value may be set to a value that exponentially decreases as frequency increases. Accordingly, noise can be effectively removed by setting such that a correction threshold value for a reception signal that is reflected at a close distance is large and a correction threshold value for a reception signal that is reflected at a remove distance is small.

As another example, the correction threshold value may be set to the same value when frequency response information is compensated for by an equalizer. That is, when frequency response information is not compensated for by an equalizer, the correction threshold value may be set to different values for frequencies as described above. If frequency response information is compensated for in advance by an equalizer, the compensation threshold value maybe set to the same value. If the correction threshold value decreases exponentially, a linear compensation threshold value may be applied if the compensation threshold value is linearly compensated for by an equalizer.

As described above, if a target signal is detected, a final target object may be detected according to an algorithm for detecting a final target object after a signal by a moving object and a signal by a fixed object are distinguished.

Figure 11:
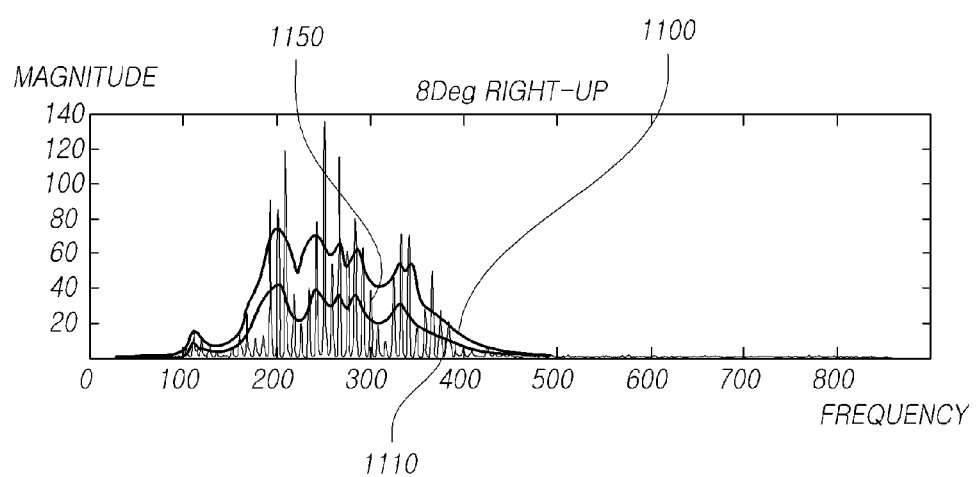
FIG. 11 is a view for explaining an operation of detecting a target object by changing a detection threshold value depending on correction of a parameter by a target detection unit according to an embodiment of the present invention.

FIG. 11 is a view for explaining an operation of detecting a target object by changing a detection threshold value depending on correction of a parameter by a target detection unit according to an embodiment of the present invention.

If it is determined that a clutter structure is present, the target detection unit of the present invention may correct a detection threshold calculation parameter such that the detection threshold calculation parameter is lower than a detection threshold value used when a clutter structure is not detected, when the detection threshold value for detecting the target object is calculated.

Referring to FIG. 11, the target detection unit may allow a target signal to be detected, by correcting a parameter for determining a detection threshold value such that the detection threshold value is lowered. For example, when a reception signal in which a target signal and a clutter signal are mixed is received, a detection threshold value is determined as indicated by 1100 according to an algorithm in which a detection threshold value is determined in consideration of the reception intensities of surrounding frequencies. In this case, the target signal 1150 has a value that is lower than the detection threshold value, and accordingly, the radar apparatus may not detect the target object.

Accordingly, if it is determined that a clutter structure is present, the target detection unit may calculate a corrected detection threshold value 1110 by correcting a parameter for calculating a detection threshold value to a preset value or a preset ratio. The corrected detection threshold value 1110 may be lowered and accordingly, a target signal 1150 may be detected.

Thereafter, if a target signal is detected, the target detection unit may detect a final target object according to an algorithm for detecting a final target object after a signal by a moving object and a signal by a fixed object are distinguished.

The above-described radar apparatus can detect a clutter structure using a reception signal and detect a target signal by adjusting a parameter when a clutter structure is present, thereby detecting a target object more promptly and precisely without being influenced by a clutter signal.

Hereinafter, a method of detecting a target object according to an embodiment of the present invention will be briefly described once again with reference to FIGS. 1 to 11.

Figure 12:
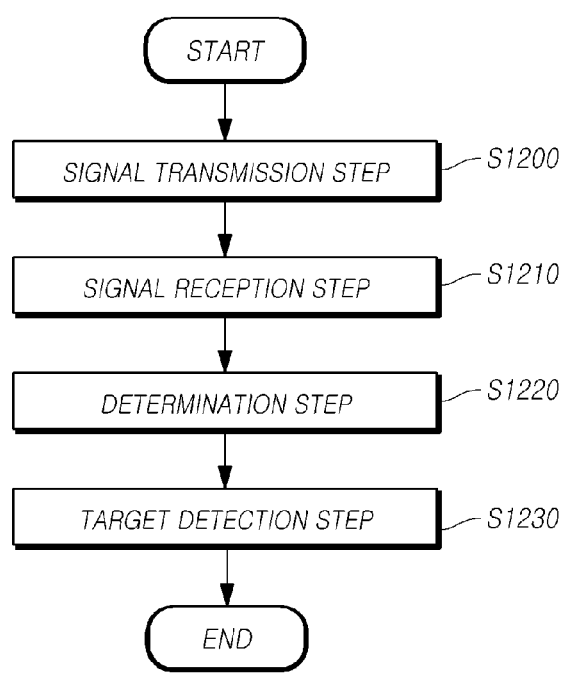
FIG. 12 is a flowchart illustrating a method of detecting a target object according to an embodiment of the present invention.

FIG. 12 is a flowchart illustrating a method of detecting a target object according to an embodiment of the present invention.

The method of detecting a target object according to the embodiment of the present invention may include a signal transmission step of transmitting a transmission signal for detecting a target object, a signal reception step of receiving a reception signal that is generated when the transmission signal is reflected, a determination step of determining a presence of a clutter structure using frequency response information of the reception signal, and a target detection step of detecting a target object by correcting a detection threshold value for detecting a target object according to a determination result on the presence of the clutter structure.

Referring to FIG. 12, the method of detecting a target object may include a signal transmission step of transmitting a transmission signal for detecting a target object (S1200). In the signal transmission step, a signal for detecting an object around a vehicle is transmitted by a radar, and for example, an RF signal may be transmitted.

The method of detecting a target object may include a signal reception step of receiving a reception signal that is generated when a transmission signal is reflected (S1210). The reception signal may include a target signal that returns after being reflected by a target object, a clutter signal that is generated when the transmission signal is reflected by a clutter structure, and a noise signal. Accordingly, the performance of the radar apparatus may be lowered.

In order to solve the problem, the method of detecting a target object according to the present invention may include a determination step of determining a presence of a clutter structure using frequency response information of the reception signal (S1220). The determination step generates frequency response information using the reception signal and determines a presence of a clutter structure in various methods according to the frequency response information. As described above, an entropy value based on signal intensities for frequencies may be calculated by using the frequency response information, and the presence of a clutter structure may be determined on the basis of a spectrum spreading degree based on the signal intensities for frequencies. In addition, in the determination step, a presence of a clutter structure may be determined from the frequency response information using various methods.

Thereafter, the method of detecting a target object may further include a target detection step of detecting a target object by correcting a detection threshold value for detecting a target object according to a determination result on the presence of the clutter structure.

As illustrated in FIGS. 9 and 11, in the target detection step, a detection threshold value may be corrected such that a target signal may be detected in spite of a clutter signal, by changing a detection threshold value to a correction threshold value or correcting a parameter for determining a detection threshold value. Furthermore, in the target detection step, a target object may be detected by using an existing algorithm if a target signal is detected. That is, as described above, a target object is detected by detecting peak signals that exceed a detection threshold value or a correction threshold value and processing the peak signals using a target detection algorithm. Furthermore, a target object may be detected via filtering based on a difference between a moving object and a fixed object.

As described above, the present invention can provide a method and an apparatus for recognizing a presence of a structure in which a clutter signal is severely generated, for example, in a steel tunnel, by analyzing a signal acquired from a radar apparatus.

Furthermore, the present invention can provide a method and an apparatus capable of recognizing a structure that severely generates a clutter signal and improving target detection performance to improve safety in a section in which the corresponding structure is installed.

Even if it was described above that all of the components of an embodiment of the present invention are coupled as a single unit or coupled to be operated as a single unit, the present invention is not necessarily limited to such an embodiment. That is, at least two elements of all structural elements may be selectively joined and operate without departing from the scope of the present invention. Although a preferred embodiment of the present invention has been described for illustrative purposes, those skilled in the art will appreciate that various modifications, additions and substitutions are possible, without departing from the scope and spirit of the invention as disclosed in the accompanying claims. The scope of the present invention shall be construed on the basis of the accompanying claims in such a manner that all of the technical ideas included within the scope equivalent to the claims belong to the present invention.

What is claimed is:

1. A radar apparatus comprising:
a signal transmission unit that transmits a transmission signal for detecting a target object;
a signal reception unit that receives a reception signal generated when the transmission signal is reflected;
a determination unit that determines a presence of a clutter structure using the reception signal; and
a target detection unit that detects a target object by correcting a detection threshold value for detecting a target object according to the determination result on the presence of the clutter structure and detects a target object,
wherein the determination unit calculates a distribution form of signal intensities for frequencies of the reception signal, and
wherein the determination unit calculates a probability distribution of the reception signal using the distribution form of signal intensities for frequencies of the reception signal, calculates an entropy value according to the calculated probability distribution, and determines a presence of the clutter structure based on the entropy value.

2. The radar apparatus of claim 1, wherein the reception signal comprises a target signal that is reflected by the target object and a clutter signal that is reflected by the clutter structure.

3. The radar apparatus of claim 1, wherein the clutter structure comprises any one of a steel tunnel, a steel noise barrier, and a steel structure.

4. The radar apparatus of claim 1, wherein if it is determined that the entropy value is a preset reference value or more, the determination unit determines that the clutter structure is present.

5. A radar apparatus comprising:
a signal transmission unit that transmits a transmission signal for detecting a target object;
a signal reception unit that receives a reception signal generated when the transmission signal is reflected;

a determination unit that determines a presence of a clutter structure using frequency response information of the reception signal; and a target detection unit that detects a target object by correcting a detection threshold value for detecting a target object according to the determination result on the presence of the clutter structure and detects a target object, wherein the determination unit compares Gini's coefficient information calculated based on the frequency response information with a predefined reference value and determines a presence of the clutter structure, and wherein the Gini's coefficient is calculated by Equation below:

$$\text{Gini's coefficient} = \frac{\text{area}(A)}{\text{area}(A) + \text{area}(B)}.$$

6. The radar apparatus of claim 5, wherein if it is determined that the Gini's coefficient information is the reference value or less, the determination unit determines that the clutter structure is present.

7. A radar apparatus comprising:
a signal transmission unit that transmits a transmission signal for detecting a target object;
a signal reception unit that receives a reception signal generated when the transmission signal is reflected;
a determination unit that determines a presence of a clutter structure using frequency response information of the reception signal; and
a target detection unit that detects a target object by correcting a detection threshold value for detecting a target object according to the determination result on the presence of the clutter structure and detects a target object,
wherein the determination unit changes the frequency response information to a binary spectrum with reference to a preset binary reference value and determines a presence of the clutter structure using the binary spectrum, and
wherein the determination unit changes the signal intensities for frequencies of the frequency response information to K if the signal intensities for frequencies of the frequency response information are the binary reference value or more, and changes the signal intensities for frequencies of the frequency response information to 0 if the signal intensities for frequencies of the frequency response information are less than the binary reference value in order to generate the binary spectrum, and here K is determined by any one value of 2a (a is a natural number that is 0 or more).

8. The radar apparatus of claim 1, wherein if it is determined that the clutter structure is present, the target detection unit detects a target signal generated by the target object by changing the detection threshold value to a preset correction threshold value.

9. The radar apparatus of claim 8, wherein the preset correction threshold value is set to different values for frequencies, and the preset correction threshold value decreases if the frequency increases.

10. The radar apparatus of claim 1, wherein the target detection unit calculates detection threshold values for detecting the target object separately according to the presence of a clutter structure, and calculates a detection threshold value using a corrected detection threshold value calculation parameter such that a detection threshold value for detecting a target object when a clutter structure is present is lower than a detection threshold value when a clutter structure is not present.

11. A method for detecting a target object using a radar, the method comprising:
transmitting a transmission signal for detecting a target object;
receiving a reception signal generated when the transmission signal is reflected;
calculating a distribution form of signal intensities for frequencies of the reception signal;
calculating a probability distribution of the reception signal using the distribution form;
calculating an entropy value according to the calculated probability distribution, and
determining a presence of a clutter structure based on the entropy value; and
correcting a detection threshold value for detecting a target object according to the determination result on the presence of the clutter structure, and detecting a target object.

12. A radar apparatus comprising:
a signal transmission unit that transmits a transmission signal for detecting a target object;
a signal reception unit that receives a reception signal generated when the transmission signal is reflected;
a determination unit that determines a presence of a clutter structure using frequency response information of the reception signal; and
a target detection unit that detects a target object by correcting a detection threshold value for detecting a target object according to the determination result on the presence of the clutter structure and detects a target object,
wherein if it is determined that the clutter structure is present, the target detection unit detects a target signal generated by the target object by changing the detection threshold value to a preset correction threshold value,
wherein the preset correction threshold value is set to different values for frequencies, and the preset correction threshold value decreases if the frequency increases.

* * * * *